United States Patent [19]

Saukkonen

[11] Patent Number: 6,141,053
[45] Date of Patent: Oct. 31, 2000

[54] METHOD OF OPTIMIZING BANDWIDTH FOR TRANSMITTING COMPRESSED VIDEO DATA STREAMS

[76] Inventor: Jukka I. Saukkonen, 5488 Sandburg Ave., San Diego, Calif. 92122-4128

[21] Appl. No.: 08/778,937

[22] Filed: Jan. 3, 1997

[51] Int. Cl.[7] ........................................... H04N 7/26
[52] U.S. Cl. .................. 348/419; 348/716; 348/384; 348/17; 348/12; 395/200.79; 709/234
[58] Field of Search ......................... 348/419, 716, 348/384, 423, 17, 7, 10, 12, 714, 715; 395/500, 200.76, 200.79, 114; 709/234, 247, 231, 219; 710/52–57; H04N 7/26

[56] References Cited

U.S. PATENT DOCUMENTS

| | | | |
|---|---|---|---|
| 5,450,530 | 9/1995 | Snyder et al. | 375/220 |
| 5,510,844 | 4/1996 | Cash et al. | 348/465 |
| 5,515,377 | 5/1996 | Horne et al. | 370/94.1 |
| 5,633,870 | 5/1997 | Gaytan et al. | 370/235 |
| 5,666,161 | 9/1997 | Kohiyama et al. | 348/408 |
| 5,666,487 | 9/1997 | Goodman et al. | 395/200.76 |
| 5,675,384 | 10/1997 | Ramamurthy et al. | 348/405 |
| 5,677,969 | 10/1997 | Auyeung et al. | 382/239 |
| 5,721,815 | 2/1998 | Ottesen et al. | 395/200.09 |
| 5,721,878 | 2/1998 | Ottesen et al. | 395/500 |
| 5,838,994 | 11/1998 | Valizadeh | 395/876 |
| 5,844,594 | 12/1998 | Ferguson | 348/384 |
| 5,884,028 | 3/1999 | Kindell et al. | 395/200.09 |
| 5,898,833 | 4/1999 | Kidder | 395/200.64 |
| 5,941,952 | 8/1999 | Thomas et al. | 709/234 |

FOREIGN PATENT DOCUMENTS

WO95 28802  10/1995  WIPO .

OTHER PUBLICATIONS

Lauderdale, J. et al.: "Using the Minimum Reservation Rate for Transmission of Pre–Encoded MPEG VBR Video Using CBR Service", IEICE Transactions on Communications, vol. E79–B, No. 8, Aug. 1996, pp. 1023–1029, XP000628639.

McManus, J.M. et al.: "Video–on–Demand Over ATM: Constant–Rate Transmission and Transport"; IEEE Journal on Selected Areas in Communications, vol. 14, No. 6, Aug. 1996, pp. 1087–1098, XP000608049.

Ni, J. et al: "CBR Transportation of VBR MPEG–2 Video Traffic for Video–On–Demand in ATM Networks"; 1996 IEEE International Conference on Communications (ICC), Converging Technologies for Tomorrow's Applications, Dallas, Jun. 23–27, 1996, vol. 3, Jun. 23, 1996, pp. 1391–1395, XP000625038 IEEE.

Feng, W–C et al.: "Smooting and Buffering for Delivery of Prerecorded Compressed Video"; Proceedings of the SPIE, vol. 2417, Feb. 6, 1995, pp. 234–242, XP000575139.

Reibman, A.R. et al.: "Constraints on Variable Bit–Rate Video for ATM Networks"; IEEE Transactions on Circuits and Systems for Video Technology, vol. 2, No. 4, Dec. 1, 1992, pp. 361–372, XP000323661.

*Primary Examiner*—John K. Peng
*Assistant Examiner*—Jean W. Désir
*Attorney, Agent, or Firm*—Gates & Cooper

[57] ABSTRACT

A system and method for transmitting blocks of compressed data in an ATM network is disclosed. Compressed data blocks representing a movie are labeled prior to transmission with the amount of data in each block and information regarding the compression ratio of each block and the time into the movie at which the block displays. A server in the system first determines the size of the receiver buffer, and then the minimum number of consecutive blocks that would fit in the buffer. It then determines minimum rate in bits per second by dividing the buffer size by the number of blocks, times 8 bits/byte, times the duration of each block in seconds. The server further instructs the receiver to wait before decompressing and displaying data by an amount of time sufficient to receive the amount of data from the first blocks of compressed data that is equal to the amount of data in the largest compressed data block in the file.

8 Claims, 3 Drawing Sheets

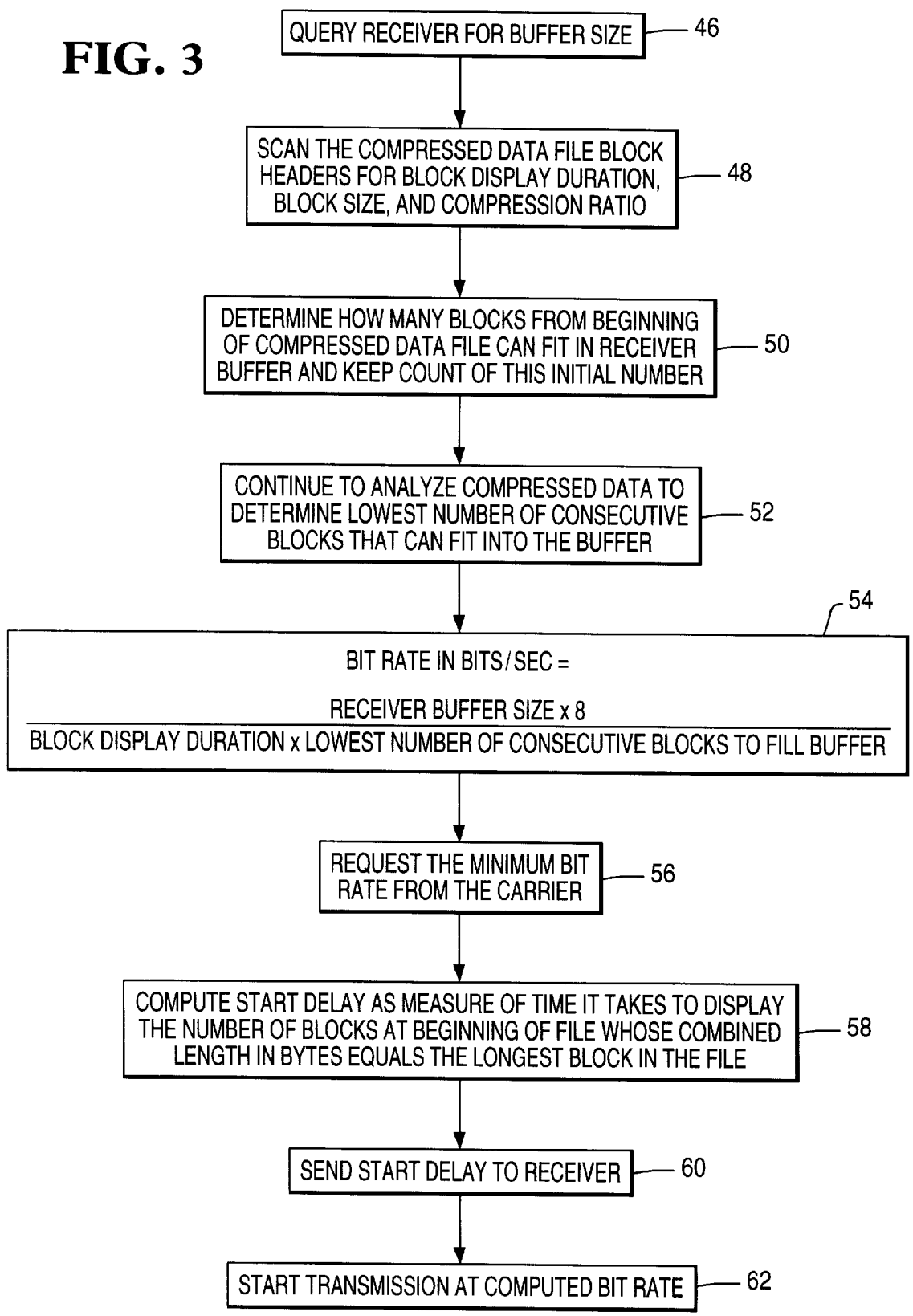

METHOD OF OPTIMIZING BANDWIDTH FOR TRANSMITTING COMPRESSED VIDEO DATA STREAMS

CROSS REFERENCE TO RELATED APPLICATION

This application is related to co-pending and commonly assigned U.S. patent application Ser. No. 08/778,929 entitled "Method Of Transmitting Compressed Information To Minimize Buffer Space", inventor Jukka I. Saukkonen, filed Jan. 3, 1997 which application is incorporated by reference herein.

BACKGROUND

1. Field of the Invention

This invention relates in general to systems and methods for transmitting compressed video and audio data, and in particular, to a system and method for pacing the transmission of compressed blocks of data from a server to a receiver that minimizes the bandwidth required to transmit the data.

2. Description of the Related Art

Recent advances in digital video and audio compression technology have created a marriage between television and personal computers. For example, it will soon be possible for a television viewer to watch a favorite video by simply downloading it to his TV through a telephone line.

Compressing the data stream that makes up such a video before sending it is desirable for two principle reasons. First, the data stream representing the movie would take too long to transmit in the uncompressed state. Second, the uncompressed data stream would take up too much memory.

Different types of compression technology are currently used. However, two technology standards, MPEG and JPEG, each with its own variations, have evolved for compressing data depicting still pictures (images) and moving pictures (video), respectively.

With still image compression, transmission by a server and decompression by a receiver only has to be fast enough so that a viewer does not get bored waiting for an image to appear. But when transmitting video, a high enough frame rate has to be accomplished to produce satisfactorily smooth motion. North American television viewers are used to a rate of 30 frames per second, which means the receiver must access, decompress, and display a new image every 30–40 milliseconds. At any slower rate, the motion will seem slow or jerky.

Video compression can drastically reduce the data rate required to transmit an otherwise uncompressed data stream. For example, when a server transmits a video of a talking face, the only data that needs to be transmitted from one frame to the next is the data showing the motion of the lips, and any other features that may be moving. Therefore, after the receiver has displayed the first scene using the data for one frame, the server can represent the subsequent frames using very little data. On the other hand, when there is a sudden scene change in the video, the server needs to send the entire background without compression. If it takes too long for this data to reach the receiver, the video will not display smoothly. To adjust for these fluctuations in data transmission, receivers typically use large buffers that can store enough data before the time it is to be displayed.

Although there are several environments currently used to transmit compressed video and audio data, the environment widely recognized as being preferable is an asynchronous transfer mode (ATM) network. ATM networks transmit an encoded data stream in short, fixed-size cells of information using statistical multiplexing. According to current standards, these cells each carry only 384 bits of data. Further, the cells arrive in the same sequence in which they were transmitted. One characteristic of ATM networks is that they guarantee delivery of transmitted data at a requested bandwidth within a highly predictable delay period.

Guaranteed delivery networks such as ATM have been used to transmit video data streams compressed into blocks of data. Depending on the video compression technology used, including variations of MPEG and JPEG, each block transmitted can contain the data for displaying one frame or a small multiple of frames of video. Thus, each block can represent a constant duration of display time regardless of its length in bytes.

Although data blocks are consumed at a constant rate in blocks/second at a receiver in a guaranteed delivery network such as ATM, some blocks take longer to transmit than others because they contain more bytes. The constant rate transmission of ATM means that the amount of time it takes blocks to reach the receiver is proportional to how large they are.

Currently, transmitting condensed video or audio data over guaranteed delivery networks like ATM presents two problems. The first problem is guaranteeing continuous delivery of information for uninterrupted display of video. The second problem is determining how much bandwidth to request, considering the size of the buffer available at the receiver.

Without continuous delivery, a person watching a video being transmitted will notice "outage," a momentary lack of picture or frozen frame, and "overlay," a loss of picture data when data is sent faster than it can be displayed.

A prior solution to preventing outage and overlay has been the use of a feedback loop between the receiver and server to ensure that the receiver does not run out of or the transmitter send too much data. However, such feedback systems can be cumbersome and increase complexity of data transmission.

Another solution to preventing outage has been to use prioritizing algorithms that separate compressed video data into a high priority "base layer" and a low priority "enhancement layer." The base layer is sent first to the receiver so that it can reconstruct a minimally acceptable image. It is followed by the low priority enhancement layer, which enhances the minimally acceptable image. If congestion develops, for example because the selected bandwidth is too low or because too much data is being transmitted at one time, the data for the low priority enhancement layer is discarded. In this way, the receiver can continue to display at least a minimally acceptable image. An example of such a system for ensuring continuous image display is provided by U.S. Pat. No. 5,515,377 issued to Horne et al., and assigned to AT&T. Although prioritizing data into low and high priority categories can help avoid total loss of video, it is disadvantageous because it inherently accepts a loss of video quality.

Requesting the appropriate bandwidth for sending compressed video is a second problem in transmitting compressed video. As the size of the buffer used in the receiver decreases, the bandwidth used to send data has to be increased to prevent outage. Conversely, when a large buffer is used, the receiver can store enough data before it starts displaying it, such that the rest of the data can be sent at a low rate. The rate of transmission in ATM networks is selected at the time a user requests bandwidth for the quality of transmission service required. While requesting too little bandwidth means there will be outage, requesting too much bandwidth means there will be unnecessary connection costs, as well as loss of data through overlay at the receiver.

SUMMARY OF THE INVENTION

To overcome the difficulties described above in transmitting data over guaranteed delivery networks like ATM, and to overcome other limitations that will become apparent upon reading and understanding the present specification, the system disclosed herein transmits compressed data blocks at a minimum uniform rate required to keep the receiver buffer at a level that will prevent outage as well as overlay at the receiver.

According to one aspect of the present invention, the compressed data blocks representing a video data stream are labeled using headers which indicate the compression ratio of each block, the number of bytes in each block, and the time in the movie at which each block gets displayed.

According to another aspect of this invention, the size of the receiver buffer is determined by the server, and the lowest number of consecutive blocks in the compressed data file that can fit into the buffer is computed. This number of blocks is then used, along with the determined display period of each block, to arrive at a minimum transmission rate that will prevent outage and overlay.

According to yet another aspect of the invention, the server instructs the receiver how long to wait before beginning to display data from the time data transmission begins. To select this delay period, the server identifies the largest block in the compressed data file. It then determines how many blocks at the beginning of the file contain that amount of data. The delay period will be the number of blocks multiplied by the display period for each block of data.

BRIEF DESCRIPTION OF THE DRAWINGS

Referring now to the drawings in which like reference numbers represent corresponding parts throughout:

FIG. 3 is a flowchart generally describing the functions performed by a server according to a preferred embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
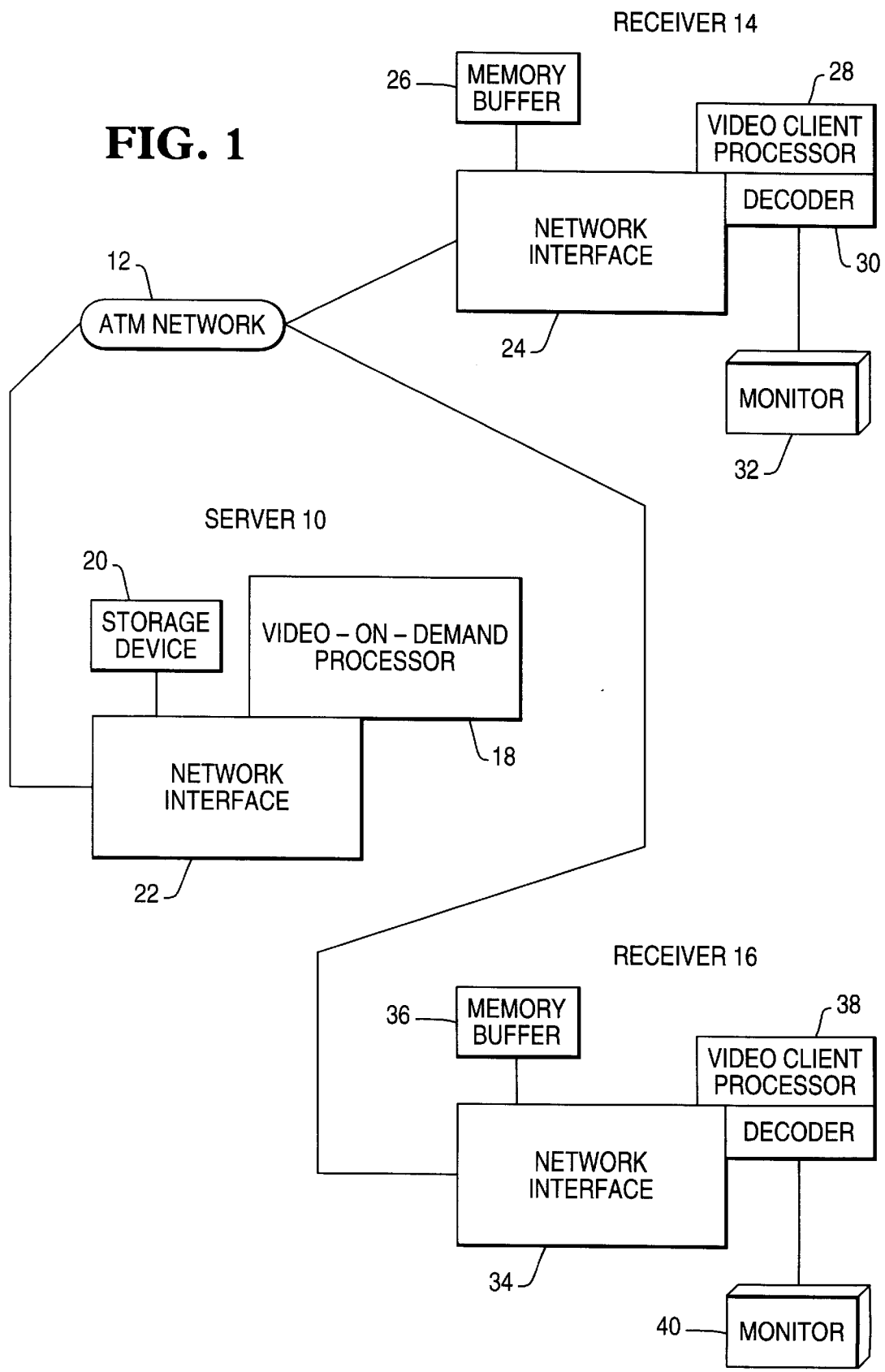
FIG. 1 represents an ATM transmission system in which the present invention can be used.

FIG. 1 illustrates a server/client network in which the present invention may be utilized. The network includes a server 10 which connects via ATM network 12 to a plurality of receivers 14–16. Server 10 includes a video-on-demand server processor 18, which controls the operation of the storage device 20 and network interface 22. The storage device 20 may be a CD ROM or optical disc or any other device suitable for storing compressed video data streams. These data streams do not have to be stored locally on storage device 20, but can be stored remotely as part of a remote file server that may be accessed through network interface 22 to a local area network. It will be understood to those of ordinary skill in the art that the ATM network 12 shown in FIG. 1 is only one type of guaranteed delivery network in which the present invention may be practiced. Other networks in which the present invention may be used include those in which transmission of a compressed video data stream from a server to a receiver can be predicted regardless of network conditions. Further, it will be understood by those of ordinary skill in the art that the present invention can also be applied to transmit other types of compressed data, including compressed audio data.

According to the present invention, the compressed video data stream stored in storage device 20 is formatted using headers for each block of compressed data.

As discussed above, depending on the compression technology used, each block contains the data for displaying one frame or small multiple of frames of a video. According to the preferred embodiment of the present invention, the data blocks are stored on storage device 20 with headers that indicate physical block size, compression ratio, and the time, relative to the beginning of a video, when the data is to be displayed. Alternatively, instead of using a separate header in each data block, the compressed video stream data file may be preceded by a block map. The block map would then contain physical address of each block, the block length, compression ratio, display time relative to the start of the video, and the overall compression ratio for the compressed video data stream.

Receivers 14 and 16 use memory buffers 26 and 36, respectively, as buffers during transmission by server 10. These buffers are preferably circular, allowing storing of data at a constant bit rate and simultaneous consumption of data at a constant block rate. The amount of data in these buffers will fluctuate depending on the size of blocks being stored and consumed. According to a preferred embodiment, these buffers must be at least large enough to hold the two largest blocks in a compressed video data stream.

Figure 2:
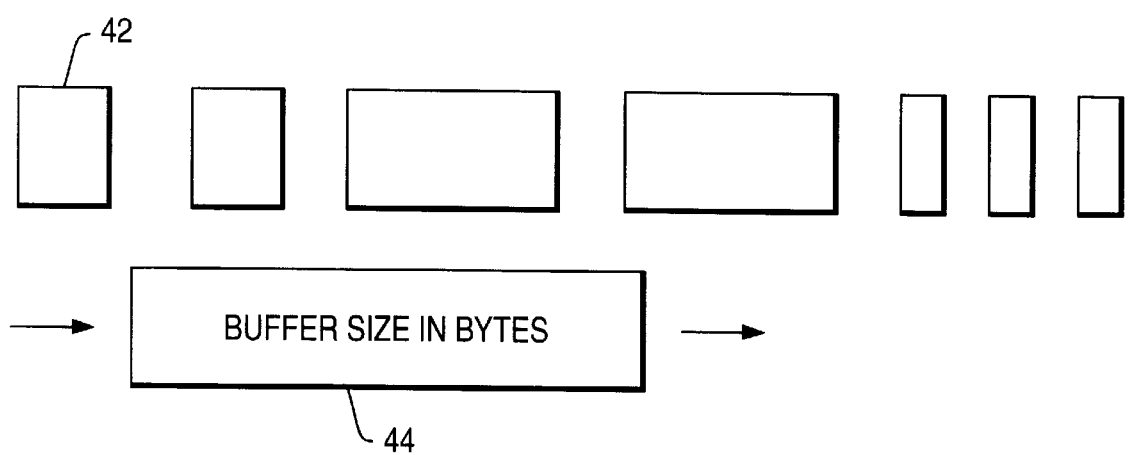
FIG. 2 represents a feature of the present invention wherein the headers in a compressed data file are scanned to determine the length and location of the least compressed sequence of compressed data blocks.

FIG. 2 illustrates an important aspect of the present invention used to determine a minimum bandwidth requirement based on the size of the receiver buffer available. Specifically, the compressed video data stream 42 is scanned by the server according to this invention to determine the lowest compression rate in the file, and determine, from this compression rate, a uniform transmission rate that ensures continuous delivery and display of the compressed video data stream. More specifically, the server scans the headers in the compressed video data stream 42, each block representing one or a multiple of frames of video in the sequence they are stored and displayed. The scanning is performed through a window 44, which is the same size as the receiver 14–16 buffer, to determine how many of the variable length blocks would sequentially fit in the buffer. By determining the smallest number of consecutive blocks of data that can fit in this window, the server can identify the least compressed area of transmission and request adequate bandwidth from the network 12 to handle this amount of data.

FIG. 3 is a flow chart illustrating the functions performed by the server 10 according to the present invention. Block 46 represents the server 10 querying the receiver 14–16 for its buffer size in bytes. Block 48 represents the server 10 scanning the compressed data file headers to obtain three labels stored in the headers. These labels indicate duration of display of each block, block size in bytes, and compression ratio. The first label, duration of display of each block, is typically uniform across the compressed data file. Thus, when a compression technique is used that compresses only one frame in each lock, the duration of display of that block in North America would be 1/30th of a second. The second label, lock size in bytes, varies for each block, as does the third label, compression ratio It should be understood that the information in these headers can alternatively be scanned from a block map preceding the compressed video data stream file.

Blocks 50 and 52 together represent the feature of scanning blocks of compressed data to determine the least compressed area. In particular, Block 50 represents the server 10 using the header information it acquired to determine an initial number of blocks from the compressed data file that can fit in the receiver 14–16 buffer without overflowing. The server 10 keeps count of how many blocks it would take to fill the buffer from the beginning of the data file.

Block 52 represents the server 10 continuing to scan the file to determine a sum of data in subsequent series of blocks that can fit in the memory buffer along the rest of the compressed data file. The server 10 continues to try to add one block at a time to the sum of the data in the initial number of blocks, and deletes blocks from the beginning of the file ; as necessary, to keep the total sum of data from becoming more than the buffer size. The server 10 continues through the file in this manner to determine the smallest number of consecutive blocks that could fit in the receiver buffer. This number represents the least compressed part of the compressed video data file.

Block 54 represents the server 10 computing the minimum bit rate needed to transmit the compressed data block. The server 10 multiplies the receiver 14–16 buffer size by 8 to obtain the maximum number of bits in the buffer. It then divides this amount by the smallest number of consecutive blocks it would take to fill the buffer, Multiplied by the block duration for a frame, (i.e. 1/30 secs if each frame is one block), to obtain a bit/sec minimum bit rate.

Block 56 represents the server 10 contacting the ATM network 12 to request the minimum bit rate from the carrier. By requesting a lowest rate required, the server 10 will save unnecessary connection costs from the phone carrier.

Block 58 represents the server 10 computing the start delay, an amount of time which the receiver 14–16 should wait while data is being transmitted before starting to decompress and display data. The start delay must be chosen so as to avoid outage caused by a worst-case scenario in which transmission of the longest block of compressed data is delayed. Accordingly, the start delay is chosen equal to the display time at the beginning of the video corresponding to the amount of data in the longest block in the entire compressed data file. For example, if the longest block is at 3 minutes into the video data stream, and it contains 100 Kbytes of data, the start delay is obtained by determining how many blocks of data at the beginning of the file will add up to 100 Kbytes, and how many seconds into the video data stream these blocks represent.

Block 60 represents the server 10 sending the start delay to the receiver 14–16 so it knows when to start displaying data after the server 10 begins transmission at Block 62. Data will now be transmitted to the receiver 14–16 at a rate that guarantees that the receiver 14–16 buffer will always have some data to be decompressed and displayed, while there will always be enough room In the buffer to receive the incoming data.

Disclosed below are a series of pseudo-code procedures that can be used in a preferred embodiment in implementing the present invention. First, a procedure is disclosed for computing the least compressed number of blocks that will fit into the receiver 14–16 buffer:

```
byte_count=0;
block_count=0;
largest_block=0;
save_count=very large number;
Send request to receiver for buffer size;
Read response;
Save buffer_size in receiver_buffer_size;
Open compressed audio/video file;
read block size information;
pointer_a=first data block information;
pointer_b=first data block information;
```

The next procedure calculates the least number of consecutive blocks in the file that will fill the receiver 14–16 buffer. The largest block size is saved to calculate the start delay at the receiving end:

```
while (more data)
{
    add 1 to block_count;
    add pointer_b -> block_size to byte_count;
    if (largest_block < pointer_b -> block_size) then
    largest_block = block_size;
    if (byte_count |> buffer_size) go to continue;
    inner_loop:
    If (byte_count > buffer_size)
    {
        subtract pointer_a -> block_size from
        byte_count;
        subtract 1 from block_count;
        if (save_count > block_count) then
        save_count = block_count;
        add 1 to pointer_a;
    }
    go to inner_loop;
    continue:
    add 1 to pointer_b;
}
```

Now the largest block size is used to calculate by how many blocks the receiver 14–16 must delay start of display in order not to run out of data:

```
pointer_a = 1;
byte_count = 0;
start_count = 0;
while (byte_count < largest_block)
    {
    add pointer_a -> block_size to byte_count;
    add 1 to start_count;
    }
```

At this point, save_count contains the lowest number of consecutive blocks that will fill the receiver 14–16 buffer. Start_count contains the number of blocks from the beginning of the file whose combined size equals the largest block in the file. Now, the minimum bandwidth required is computed in bits/second. This is the receiver 14–16 buffer size multiplied by 8 (to obtain the number of bits), divided by the minimum number of consecutive blocks in the file that will fill the buffer, and divided by the display duration of a block (the display time for each block is the same):

required_bandwidth=(buffer_size/save_count*block_duration)*8;

The next procedure will set the required delay at the receiver 14–16:

send start_count to receiver;
request required_bandwidth from ATM service;

Then, a request to set the quality of transmission can be made using the following procedure:

set minimum bandwidth;

Finally, data can be transmitted using a procedure that allows the server 10 to control timing of the transmission at a specific rate, because the service provider may have provided the server 10 the next larger incremental amount of bandwidth than the one requested, if it sells service in bandwidth increments. Thus, the procedure used must start transmitting data at the required rate, not the bandwidth provided by the service.

CONCLUSION

In summary, a system and method for transmitting compressed data blocks representing a video/audio file using a minimum constant rate has been disclosed. By storing header information for each compressed data block indicating the amount of data in bytes it contains and how far into the video data stream it plays, a server can determine the lowest number of blocks that can be stored in a receiver 14–16 buffer, and from that data, calculate the minimum transmission rate. The server can then also determine the required start delay time by determining the largest number of bytes in any one compressed data block, and by instructing the receiver 14–16 to wait before displaying data until it receives that amount of data from the first blocks in the compressed data file.

The disclosed method guarantees against "outage" and "overlay," and ensures that the lowest possible transmission bit rate is requested. The larger the receiver 14–16 buffer, the lower the bit rate can be, since fluctuations in block size are averaged over a larger "window". Further, reserving extra buffer space for the largest single block guarantees that there is always enough room in the buffer for the largest possible aberration in compression rate.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a data transmission system including a server that acts as a data source and a receiver that uses data to generate output, a method of transmitting data in a compressed data block file from the server to the receiver, wherein compressed data blocks in the compressed data block file collectively represent an uncompressed data stream, wherein each block is compressed in relation to a segment of the data stream it represents at a selected compression ratio, and wherein the receiver has a buffer space to store data before using the data to generate output, the method comprising:

(a) determining the size of the receiver buffer space;
   (b) identifying the amount of data contained in the largest data block in the file;
   (c) delivering an initial amount of data for storage in the receiver buffer space before the receiver starts using the data to generate output, where the initial amount of data equals the amount of data contained in the largest data block in the file; and
   (d) transmitting data from the server to the receiver at a minimum rate selected to prevent the receiver buffer from becoming empty, including:
      (i) reading header information for each compressed data block and using this information to calculate the smallest number of consecutive blocks that will fit in the receiver buffer space; and
      (ii) dividing said size of the receiver buffer space by said smallest number of consecutive blocks that will fit in said receiver buffer space, and multiplying the result by eight times a display period for each compressed data block at the receiver.

2. In a data transmission system including a server that acts as a data source and a receiver that uses data to generate output, a method of transmitting data in a compressed data block file from the server to the receiver, wherein compressed data blocks in the compressed data block file collectively represent an uncompressed data stream, wherein each block is compressed in relation to a segment of the data stream it represents at a selected compression ratio, and wherein the receiver has a buffer space to store data before using the data to generate output, the method comprising:

(a) determining the size of the receiver buffer space;
   (b) identifying the amount of data contained in the largest data block in the file; and
   (c) delivering an initial amount of data for storage in the receiver buffer space before the receiver starts using the data to generate output, where the initial amount of data equals the amount of data contained in the largest data block in the file, including:
      (d) reading block header information from the compressed data file to identify the amount of data contained in the largest compressed data block in the file;
      (e) reading block header information from the compressed data block file identifying a video display time at which each of the compressed data blocks will display video; and
      (f) calculating how long into the video display the amount of data contained in the largest data block will have been decompressed by the receiver.

3. A data transmission system, including a server that acts as a data source and a receiver that uses data to generate output, for transmitting data in a compressed data block file from the server to the receiver, wherein compressed data blocks in the compressed data block file collectively represent an uncompressed data stream, each block being compressed in relation to a segment of the data stream it represents at a selected compression ratio, and wherein the receiver has a buffer space to store data before using the data to generate output, comprising:

(a) means for determining the size of the receiver buffer space;
   (b) means for identifying the amount of data contained in the largest data block in the file;
   (c) means for delivering an initial amount of data for storage in the receiver buffer space before the receiver starts using the data to generate output, where the initial amount of data equals the amount of data contained in the largest data block in the file; and
   (d) means for transmitting data from the server to the receiver at a minimum rate selected to prevent the receiver buffer from becoming empty, including:
      (i) means for reading header information for each compressed data block and using the information to calculate a smallest number of consecutive blocks that will fit in the receiver buffer space; and (ii) means for dividing said size of the receiver buffer space by said smallest number of consecutive blocks that will fit in said receiver buffer space, and multiplying the result by eight times a display period for each compressed data block at the receiver.

4. A data transmission system, including a server that acts as a data source and a receiver that uses data to generate output, for transmitting data in a compressed data block file from the server to the receiver, wherein compressed data blocks in the compressed data block file collectively represent an uncompressed data stream, each block being compressed in relation to a segment of the data stream it represents at a selected compression ratio, and wherein the receiver has a buffer space to store data before using the data to generate output, comprising:

(a) means for determining the size of the receiver buffer space;

(b) means for identifying the amount of data contained in the largest data block in the file; and (c) means for delivering an initial amount of data for storage in the receiver buffer space before the receiver starts using the data to generate out, where the initial amount of data equals the amount of data contained in the largest data block in the file, including:

(d) means for reading block header information from the compressed data file to identify the amount of data contained in the largest compressed data block in the file;

(e) means for reading block header information from the compressed data block file identifying a video display time at which each of the compressed data blocks will display video; and (f) means for calculating how long into the video display the amount of data contained in the largest data block will have been decompressed by the receiver.

5. In a data transmission system including a server and a receiver, a method of transmitting data in a compressed data block file from the server to the receiver at a constant rate, wherein compressed data blocks in the compressed data block file collectively represent an uncompressed data stream, each block is compressed in relation to a segment of data stream it represents by a compression ratio, and the receiver has a buffer space to store data before displaying it, comprising the steps of:

(a) determining the size of the receiver buffer space;

(b) determining an initial amount of data to store in the receiver buffer space before the receiver starts to display data; and (c) transmitting data from the server to the receiver at a minimum rate to prevent the receiver buffer from becoming empty;

wherein transmitting data from the server to the receiver at a minimum rate includes:

(d) reading header information from each compressed data block to determine a smallest number of consecutive blocks that will fit in the receiver buffer space; and (e) dividing said size of the receiver buffer space by said smallest number of consecutive blocks that will fit in said receiver buffer space, and multiplying the result by eight times a display period for each compressed data block at the receiver.

6. In a data transmission system including a server and a receiver, a method of transmitting data in a compressed data block file from the server to the receiver at a constant rate, wherein compressed data blocks in the compressed data block file collectively represent an uncompressed data stream, each block is compressed in relation to a segment of data stream it represents by a compression ratio, and the receiver has a buffer space to store data before displaying it, comprising the steps of:

(a) determining the size of the receiver buffer space;

(b) determining an initial amount of data to store in the receiver buffer space before the receiver starts to display data; and (c) transmitting data from the server to the receiver at a minimum rate to prevent the receiver buffer from becoming empty;

wherein the step of determining an initial amount of data to store in the receiver buffer space comprises the steps of:

(d) reading block header information throughout the compressed data file to identify a compressed data block having the largest amount of bytes in the file;

(e) reading block header information at the beginning of the compressed data block file identifying a video display tine at which the compressed data blocks will display video; and (f) determining how long into the video display an a mount of data equal to said largest number of bytes will have been decompressed by the receiver.

7. A data transmission system including a server and a receiver, for transmitting data in a compressed data block file from the server to the receiver at a constant rate, wherein compressed data blocks in the compressed data block file collectively represent an uncompressed data stream, each block being compressed in relation to a segment of data stream it represents by a compression ratio, and wherein the receiver has a buffer space to store data before displaying it, comprising:

(a) means for determining the size of the receiver buffer space;

(b) means for determining an initial amount of data to store in the receiver buffer space before the receiver starts to display data; and (c) means for transmitting data from the server to the receiver at a minimum rate to prevent the receiver buffer from becoming empty;

wherein the means for transmitting data from the server to the receiver at the minimum rate includes:

(d) means for reading header information on each compressed data block to determine a smallest number of consecutive blocks that will fit in the receiver buffer space; and (e) means for dividing said size of the receiver buffer space by said smallest number of consecutive blocks that will fit in said receiver buffer space, and multiplying the result by eight times a display period for each compressed data block at the receiver.

8. A data transmission system including a server and a receiver, for transmitting data in a compressed data block file from the server to the receiver at a constant rate, wherein compressed data blocks in the compressed data block file collectively represent an uncompressed data stream, each block being compressed in relation to a segment of data stream it represents by a compression ratio, and wherein the receiver has a buffer space to store data before displaying it, comprising:

(a) means for determining the size of the receiver buffer space;

(b) means for determining an initial amount of data to store in the receiver buffer space before the receiver starts to display data; and (c) means for transmitting data from the server to the receiver at a minimum rate to prevent the receiver buffer from becoming empty;

wherein the means for determining an initial amount of data to store in the receiver buffer space includes:

(d) means for reading block header information throughout the compressed data file to identify a compressed data block having the largest amount of bytes in the file;

(e) means for reading block header information at the beginning of the compressed data block file identifying a video display time at which the compressed data blocks will display video; and (f) means for determining how long into the video display an amount of data equal to said largest number of bytes will have been decompressed by the receiver.

* * * * *